United States Patent
Jastrzebski

(10) Patent No.: US 10,574,741 B2
(45) Date of Patent: Feb. 25, 2020

(54) MULTI-LEVEL LOAD BALANCING

(71) Applicant: Nokia Technologies Oy, Espoo (FI)

(72) Inventor: Lukasz Jastrzebski, Cupertino, CA (US)

(73) Assignee: Nokia Technologies Oy, Espoo (FI)

( * ) Notice: Subject to any disclaimer, the term of this patent is extended or adjusted under 35 U.S.C. 154(b) by 664 days.

(21) Appl. No.: 15/131,317

(22) Filed: Apr. 18, 2016

(65) Prior Publication Data

US 2017/0302730 A1  Oct. 19, 2017

(51) Int. Cl.
*G06F 15/177* (2006.01)
*H04L 29/08* (2006.01)
*H04L 12/803* (2013.01)
*H04L 12/24* (2006.01)
*H04L 12/707* (2013.01)
*H04L 12/715* (2013.01)

(52) U.S. Cl.
CPC ...... *H04L 67/1008* (2013.01); *H04L 41/0816* (2013.01); *H04L 47/125* (2013.01); *H04L 41/08* (2013.01); *H04L 45/04* (2013.01); *H04L 45/24* (2013.01)

(58) Field of Classification Search
CPC . H04L 67/1008; H04L 41/08; H04L 41/0816; H04L 45/04
See application file for complete search history.

(56) References Cited

U.S. PATENT DOCUMENTS

| | | | |
|---|---|---|---|
| 6,725,253 B1 | 4/2004 | Okano et al. | |
| 8,966,050 B2 | 2/2015 | Wu et al. | |
| 9,059,999 B2 * | 6/2015 | Koponen | H04L 47/12 |
| 2006/0155862 A1* | 7/2006 | Kathi | H04L 45/38 |
| | | | 709/229 |
| 2009/0193146 A1* | 7/2009 | Albert | G06F 9/5083 |
| | | | 709/241 |
| 2010/0257258 A1* | 10/2010 | Liu | H04L 29/12066 |
| | | | 709/220 |

(Continued)

OTHER PUBLICATIONS

Liang, Po-Huei, et al. "Evaluation of Two-Level Global Load Balancing Framework in Cloud Environment." International Journal of Computer Science and Information Technology, vol. 7, No. 2, Apr. 2015, pp. 1-15.

(Continued)

*Primary Examiner* — Moustafa M Meky
*Assistant Examiner* — Kidest Mendaye
(74) *Attorney, Agent, or Firm* — Alston & Bird LLP

(57) ABSTRACT

Various methods are provided for facilitating the assignment of a DNS name to load balancers in a dynamically partitioned cluster environment. One example method may comprise receiving cluster configuration information from a cluster configuration observer, the cluster configuration information comprising information indicative of each of a plurality of instances of running application and one or more servers and associated ports to which at least one of the plurality of instances is bound, receiving a request from a first level load balancer requiring a call to the first application, determining, based on the cluster configuration information, to which port the instance of the first application is bound, and transmitting the request to the port to which the instance of the first application is bound.

22 Claims, 6 Drawing Sheets

(56) References Cited

U.S. PATENT DOCUMENTS

| | | |
|---|---|---|
| 2011/0314119 A1 | 12/2011 | Kakadia et al. |
| 2014/0310390 A1* | 10/2014 | Sorenson, III .......... H04L 47/10 709/223 |
| 2014/0310418 A1 | 10/2014 | Sorenson et al. |
| 2014/0379938 A1 | 12/2014 | Bosch et al. |
| 2015/0124622 A1 | 5/2015 | Kovvali et al. |
| 2015/0189009 A1 | 7/2015 | Bemmel |
| 2015/0281104 A1 | 10/2015 | Golshan et al. |
| 2015/0301869 A1 | 10/2015 | Chan et al. |
| 2015/0334179 A1 | 11/2015 | Eisenbud et al. |
| 2016/0366220 A1* | 12/2016 | Gottlieb .............. H04L 67/1095 |

OTHER PUBLICATIONS

International Search Report and Written Opinion for Application No. PCT/FI2017/050269, dated Jun. 14, 2017.

* cited by examiner

MULTI-LEVEL LOAD BALANCING

TECHNOLOGICAL FIELD

Embodiments of the present invention relate generally to multi-level load balancing as well as a method, apparatus, and computer program product for providing multi-level load balancing enabling the assignment of a Domain Name System (DNS) name to load balancers in a dynamically partitioned cluster environment.

BACKGROUND

In a conventional system, such as for example, statically partitioned cluster environments, a DNS name may be assigned to a load balancer or group of load balancers. For example, the conventional process may include splitting a plurality of servers into groups, assigning a single application to a single group of servers, and configuring each load balancer or load balancer group to route traffic to a single server group.

In this regard, areas for improving conventional systems have been identified. Through applied effort, ingenuity, and innovation, solutions to improve such systems have been realized and are described in connection with embodiments of the present invention.

BRIEF SUMMARY

A method, apparatus and computer program product are therefore provided according to an example embodiment of the present invention for providing multi-level load balancing enabling the assignment of a DNS name to load balancers in a dynamically partitioned cluster environment or a container based environment.

In some embodiments, a system enabling the assignment of a DNS name to load balancers in a dynamically partitioned cluster environment may be provided, the system comprising a first level load balancer, a second level load balancer, a cluster configuration observer, and a plurality of servers, each configured to run one or more instances of applications, an instance of a first application being bound to a first port, the cluster configuration observer configured to receive cluster configuration information, the cluster configuration information comprising information indicative of one or more instances of running application and associated ports to which the one or more of instances is bound, and provide the cluster configuration information to a second level load balancer, the second level load balancer configured to receive configuration information of the second level load balancer that comprises the cluster configuration information, receive a request from the first level load balancer requiring a call to the first application, determine, based on the cluster configuration information, to which port the instance of the first application is bound, transmit the request to the port to which the instance of the first application is bound, and receive a response, the first level load balancer configured to receive the request from a client device, transmit, to the second level load balancer, the request, and receive the response from the second level load balancer, and transmit the response to the client device.

In some embodiments, an apparatus may be provided, the apparatus comprising at least one processor and at least one memory including computer program code, the at least one memory and the computer program code configured to, with the processor, cause the apparatus to receive cluster configuration information from a cluster configuration observer, the cluster configuration information comprising information indicative of a plurality of instances of running application and one or more servers and associated ports to which at least one of the plurality of instances is bound, receive a request from a first level load balancer requiring a call to the first application, determine, based on the cluster configuration information, to which port the instance of the first application is bound, transmit the request to the port to which the instance of the first application is bound, and receive a response the at least one instance of the first application.

In some embodiments, the apparatus further comprises computer program code configured to, with the processor, cause the apparatus to determine, based on the cluster configuration information, whether a healthy instance of the first application is running. In some embodiments, the apparatus further comprises computer program code configured to, with the processor, cause the apparatus to determine whether the cluster configuration information is stale, and in an instance in which a determination is made that the cluster configuration is stale, updating the cluster configuration information. In some embodiments, the apparatus further comprises computer program code configured to, with the processor, cause the apparatus to maintain storage of the cluster configuration information, and periodically access the cluster configuration observer to update stored cluster configuration information.

In some embodiments, the apparatus further comprises computer program code configured to, with the processor, cause the apparatus to periodically receive, from the cluster configuration observer, updated cluster configuration information. In some embodiments, the computer program code configured to, with the processor, cause the apparatus to determine, based on the cluster configuration information, to which port the instance of the first application is bound, further comprises computer program code configured to, with the processor, cause the apparatus to access a routing table, the routing table configured to store the information indicative of the one or more servers and the associated ports to which the at least one of the plurality of instances of the first application is bound. In some embodiments, the apparatus further comprises computer program code configured to, with the processor, cause the apparatus to request updated cluster configuration information upon reception of the request from the first level load balancer.

In some embodiments, a computer program product may be provided, the computer program product comprising at least one non-transitory computer-readable storage medium having computer-executable program code instructions stored therein, the computer-executable program code instructions comprising program code instructions for receiving cluster configuration information from a cluster configuration observer, the cluster configuration information comprising information indicative of a plurality of instances of running application and one or more servers and associated ports to which at least one of the plurality of instances is bound, receiving a request from a first level load balancer requiring a call to the first application, determining, based on the cluster configuration information, to which port the instance of the first application is bound, transmitting the request to the port to which the instance of the first application is bound, and receiving a response the at least one instance of the first application.

In some embodiments, the computer-executable program code instructions further comprise program code instructions for determining, based on the cluster configuration information, whether a healthy instance of the first application is running. In some embodiments, the computer-executable program code instructions further comprise program code instructions for determining whether the cluster configuration information is stale, and in an instance in which a determination is made that the cluster configuration is stale, updating the cluster configuration information.

In some embodiments, the computer-executable program code instructions further comprise program code instructions for maintaining storage of the cluster configuration information, and periodically accessing the cluster configuration observer to update stored cluster configuration information.

In some embodiments, the computer-executable program code instructions further comprise program code instructions for periodically receiving, from the cluster configuration observer, updated cluster configuration information. In some embodiments, the computer-executable program code instructions comprising program code instructions for causing the apparatus to determine, based on the cluster configuration information, to which port the instance of the first application is bound, further comprise program code instructions for accessing a routing table, the routing table configured to store the information indicative of the one or more servers and the associated ports to which the at least one of the plurality of instances of the first application is bound. In some embodiments, the computer-executable program code instructions further comprise program code instructions for requesting updated cluster configuration information upon reception of the request from the first level load balancer.

In some embodiments, a method may be provided, the method comprising receiving cluster configuration information from a cluster configuration observer, the cluster configuration information comprising information indicative of a plurality of instances of running application and one or more servers and associated ports to which at least one of the plurality of instances is bound, receiving a request from a first level load balancer requiring a call to the first application, determining, based on the cluster configuration information, to which port the instance of the first application is bound, transmitting the request to the port to which the instance of the first application is bound, and receiving a response the at least one instance of the first application.

In some embodiments, the method may further comprise determining, based on the cluster configuration information, whether a healthy instance of the first application is running. In some embodiments, the method may further comprise determining whether the cluster configuration information is stale, and in an instance in which a determination is made that the cluster configuration is stale, updating the cluster configuration information. In some embodiments, the method may further comprise maintaining storage of the cluster configuration information, and periodically accessing the cluster configuration observer to update stored cluster configuration information.

In some embodiments, the method may further comprise periodically receiving, from the cluster configuration observer, updated cluster configuration information. In some embodiments, the step of causing the apparatus to determine, based on the cluster configuration information, to which port the instance of the first application is bound, may further comprise accessing a routing table, the routing table configured to store the information indicative of the one or more servers and the associated ports to which the at least one of the plurality of instances of the first application is bound. In some embodiments, the method may further comprise requesting updated cluster configuration information upon reception of the request from the first level load balancer.

BRIEF DESCRIPTION OF THE DRAWINGS

Figure 1:
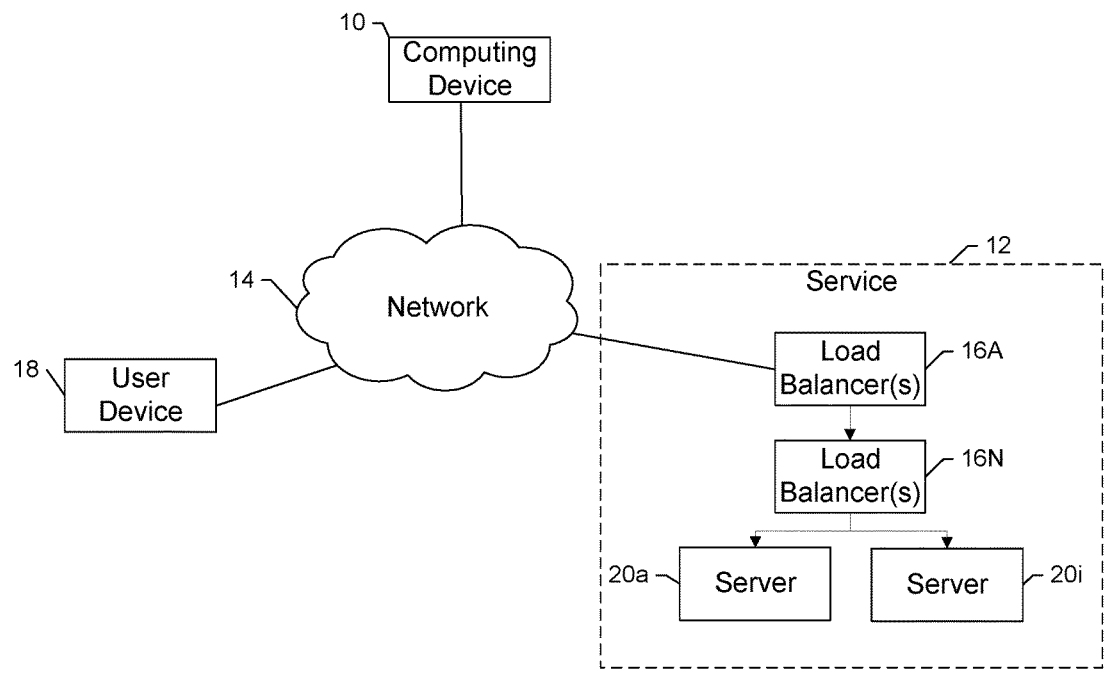
Figure 2:
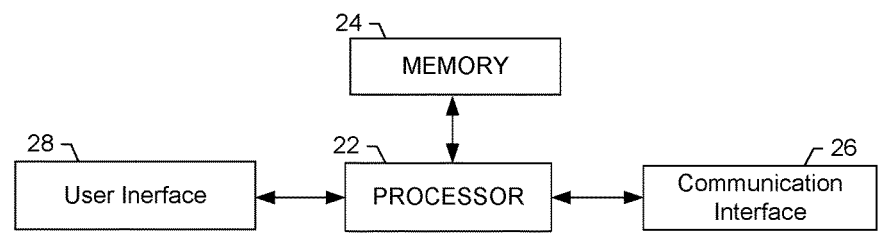
Figure 3:
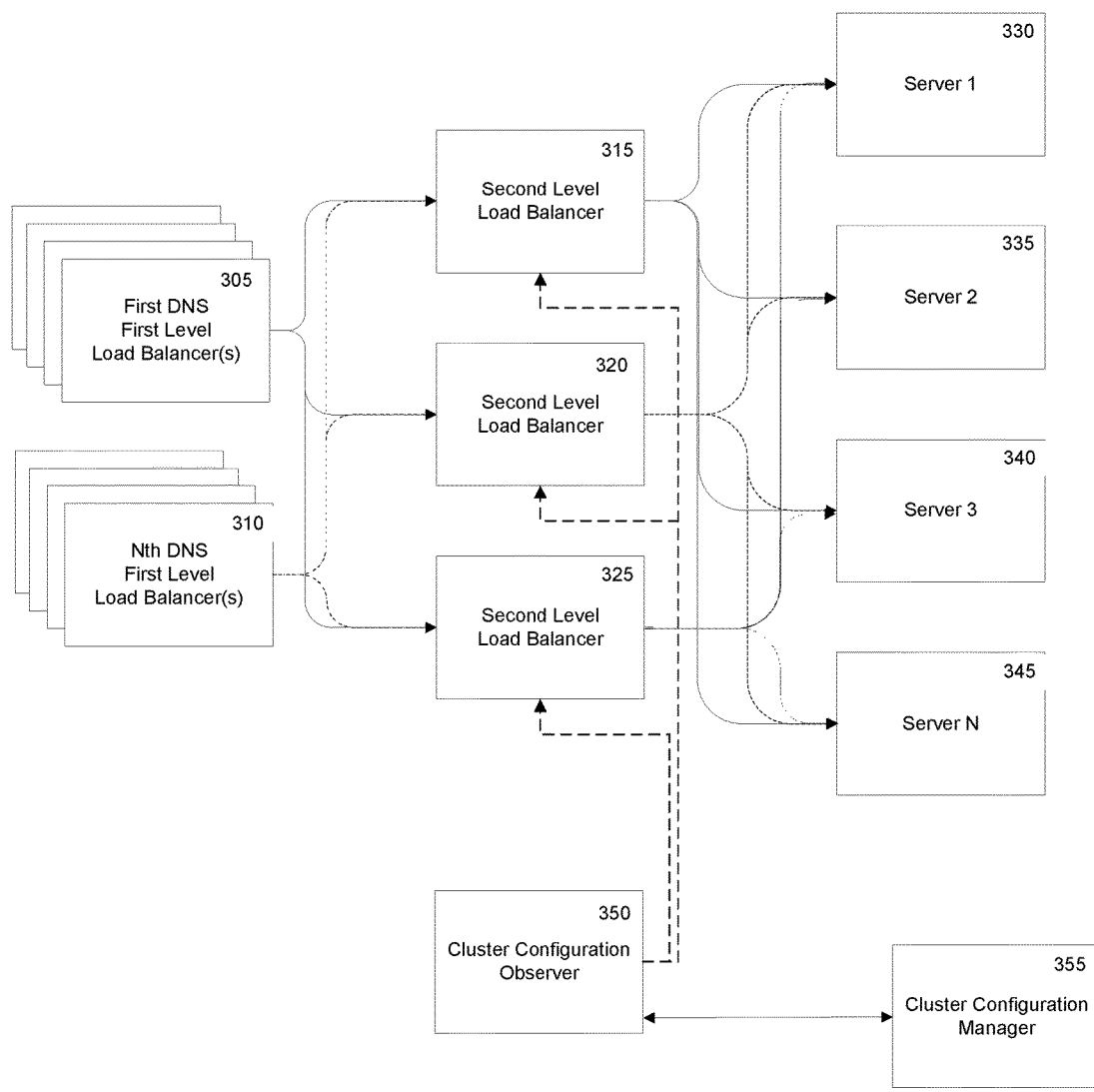
Figure 4:
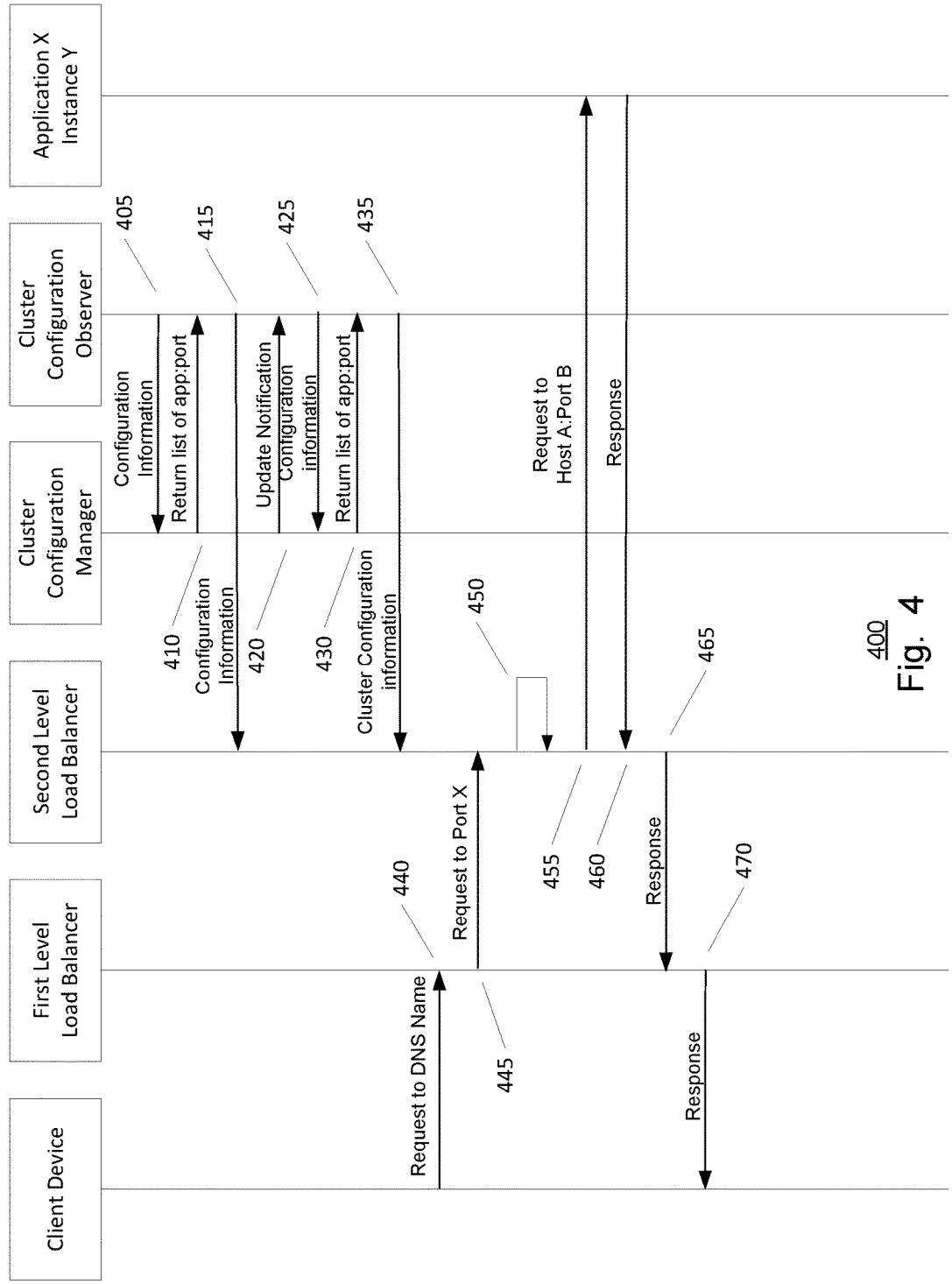
Figure 5:
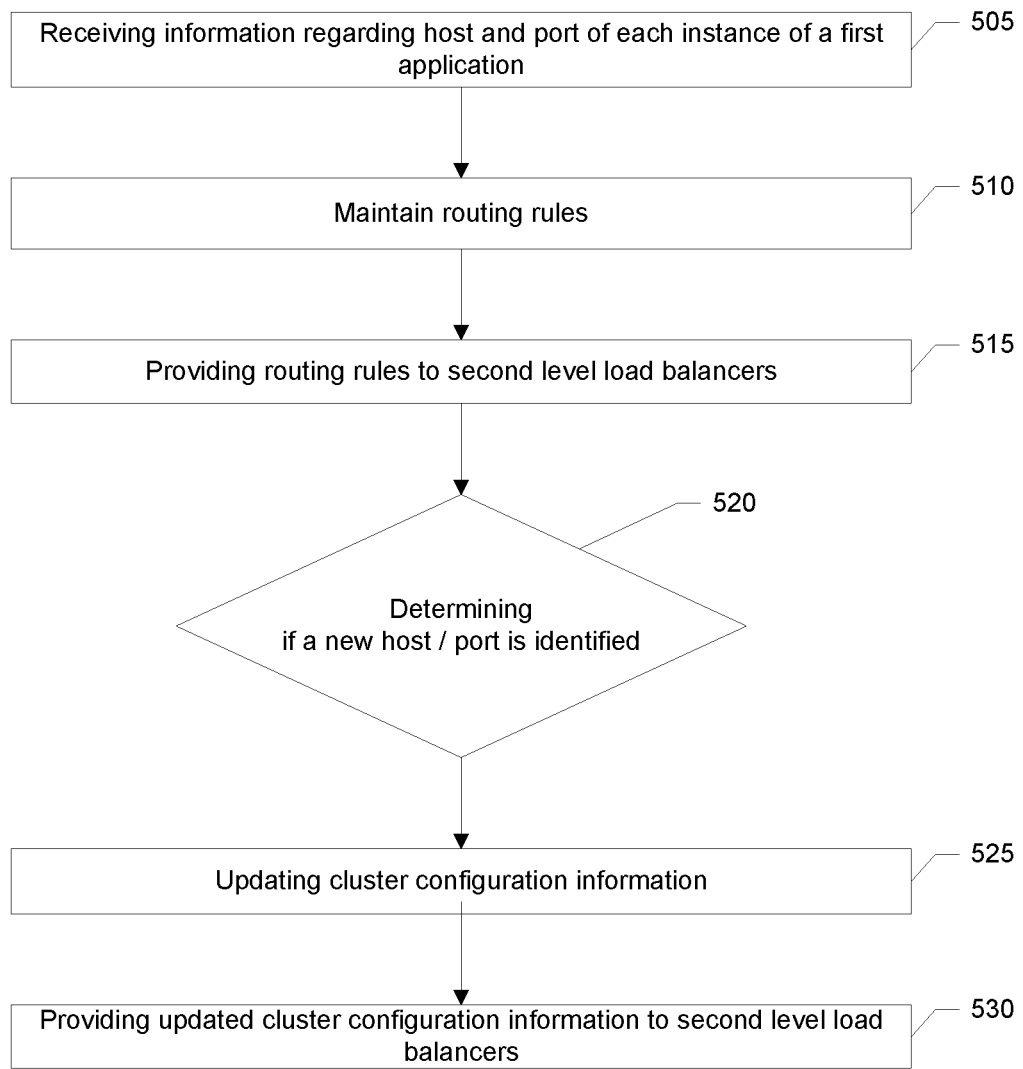
Figure 6:
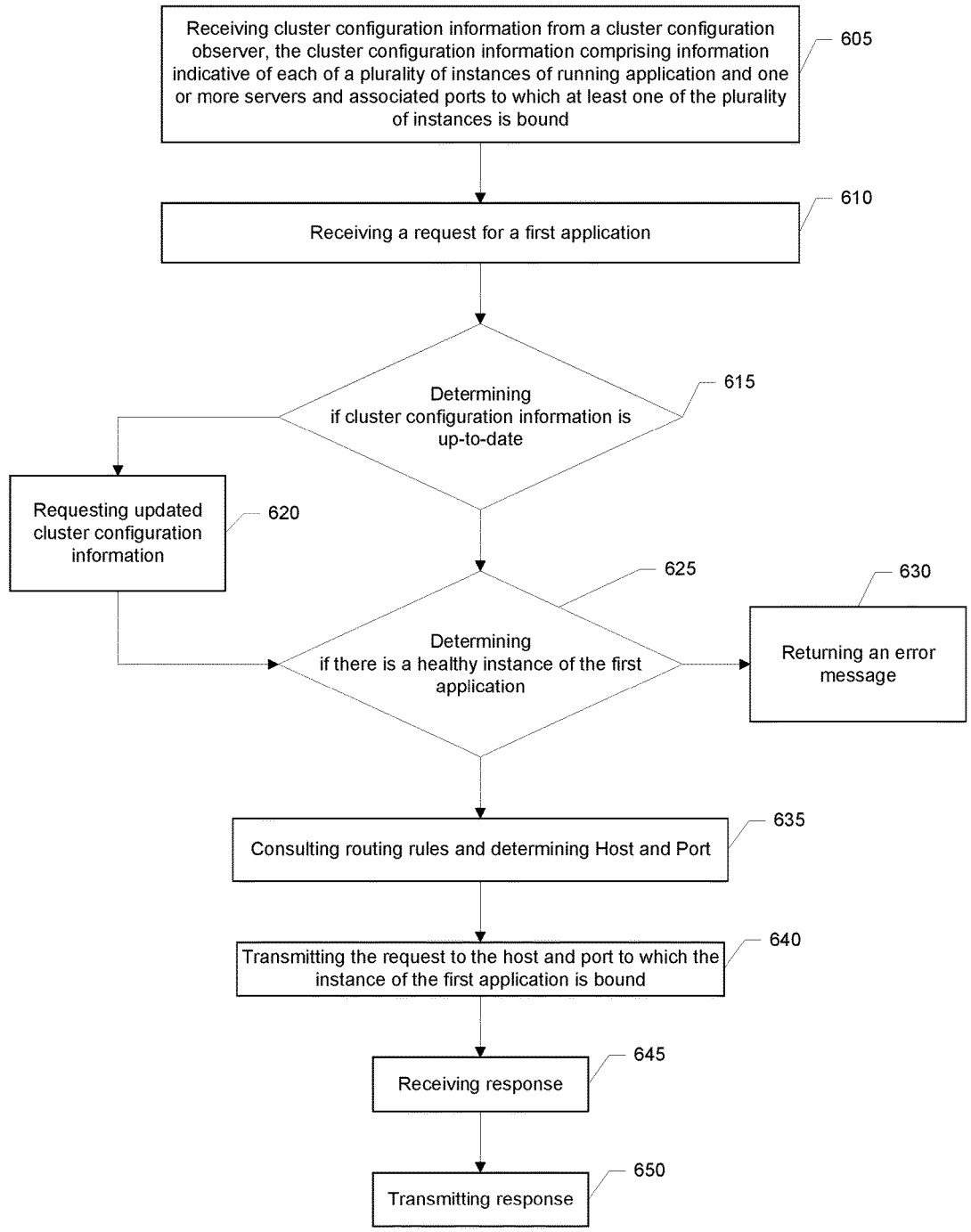
Figure 7:
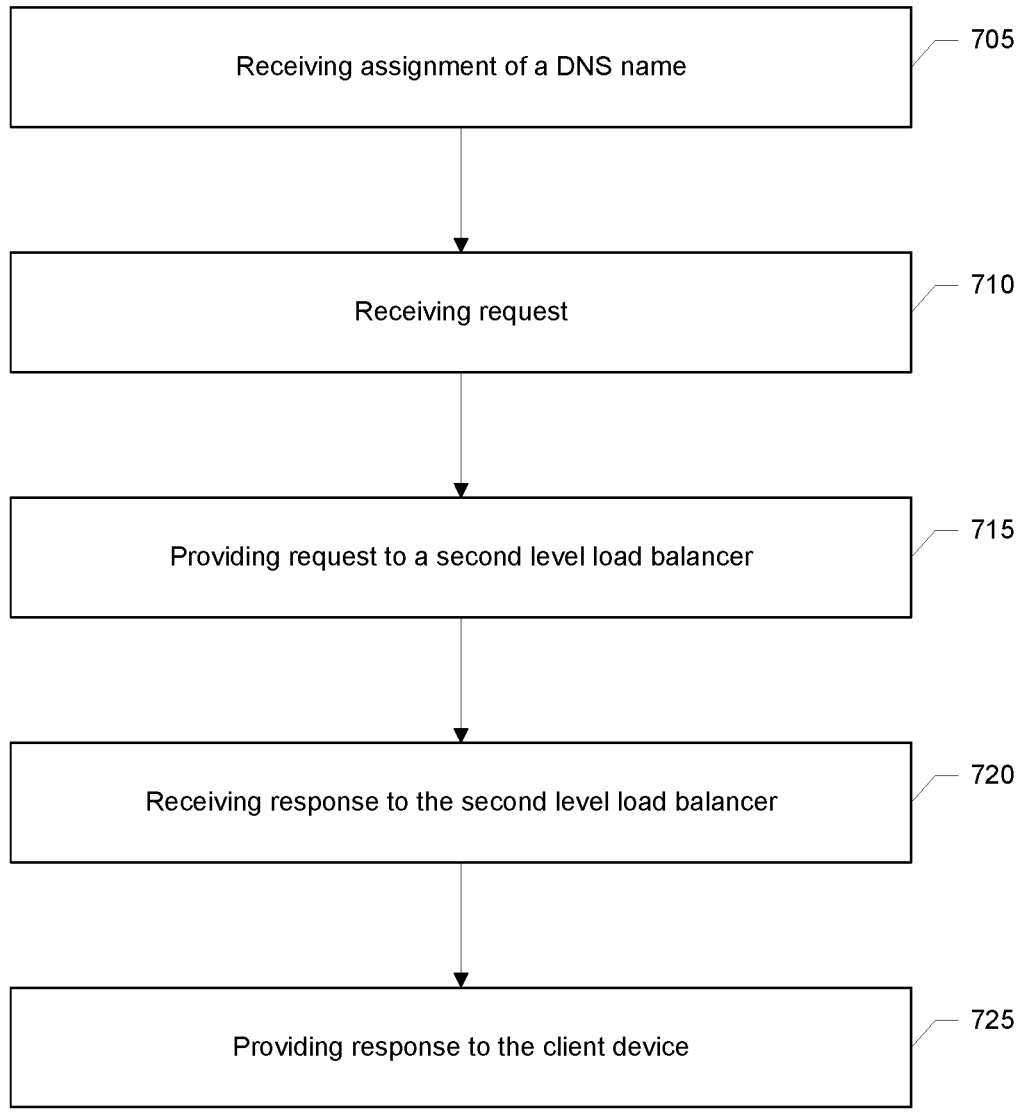

Having thus described embodiments of the invention in general terms, reference will now be made to the accompanying drawings, which are not necessarily drawn to scale, and wherein:

FIG. 1 is block diagram of a system that may be specifically configured in accordance with an example embodiment of the present invention;

FIG. 2 is a block diagram of an apparatus that may be specifically configured in accordance with an example embodiment of the present invention;

FIG. 3 is block diagram of a system that may be specifically configured in accordance with an example embodiment of the present invention;

FIG. 4 is a data flow diagram showing an exemplary process performed in accordance with some example embodiments of the present invention;

FIG. 5 is a flowchart showing an exemplary method of operating an example apparatus in accordance with an example embodiment of the present invention;

FIG. 6 is a flowchart showing an exemplary method of operating an example apparatus in accordance with an example embodiment of the present invention; and FIG. 7 is a flowchart showing an exemplary method of operating an example apparatus in accordance with an example embodiment of the present invention.

DETAILED DESCRIPTION

Some example embodiments will now be described more fully hereinafter with reference to the accompanying drawings, in which some, but not all embodiments are shown. Indeed, the example embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term "circuitry" refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or application specific integrated circuit for a mobile phone or a similar integrated circuit in a server, a cellular network device, or other network device.

System Architecture

Referring now of FIG. 1, a system that supports communication, either wirelessly or via a wireline, between a computing device 10, service 12, and client device 18 is illustrated. As shown, the computing device 10, service 12, and client device 18 may be in communication via a network 14, such as a wide area network, such as a cellular network or the Internet, or a local area network. However, the computing device 10, service 12, and client device 18 may be in communication in other manners, such as via direct communications. The client device 18 may be hereinafter described as a mobile terminal, but may be either mobile or fixed in the various embodiments, The computing device 10 and client device 18 may be embodied by a number of different devices including mobile computing devices, such as a personal digital assistant (PDA), mobile telephone, smartphone, laptop computer, tablet computer, or any combination of the aforementioned, and other types of voice and text communications systems. Alternatively, the computing device may be a fixed computing device, such as a personal computer, a computer workstation or the like. Service 12 may also be embodied by or include a computing device and, in one embodiment, is embodied by a web server. As shown in FIG. 1, service 12 may also include one or more levels of load balancers or groups of load balancers 16A-16N and one or more servers or groups of servers 20a-20i. Additionally, while the system of FIG. 1 depicts a single service, the service may be comprised of a plurality of services which may collaborate to support browsing activity conducted by the computing device.

Apparatus Architecture

Regardless of the type of device that embodies the computing device 10, the computing device may include or be associated with an apparatus 20 as shown in FIG. 2. In this regard, the apparatus may include or otherwise be in communication with a processor 22, a memory device 24, a communication interface 26 and a user interface 28. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 22 (and/or co-processors or any other processing circuitry assisting or otherwise associated with the processor) may be in communication with the memory device 24 via a bus for passing information among components of the apparatus. The memory device 24 may include, for example, one or more volatile and/or non-volatile memories. In other words, for example, the memory device 24 may be an electronic storage device (e.g., a computer readable storage medium) comprising gates configured to store data (e.g., bits) that may be retrievable by a machine (e.g., a computing device like the processor). The memory device 24 may be configured to store information, data, content, applications, instructions, or the like for enabling the apparatus 20 to carry out various functions in accordance with an example embodiment of the present invention. For example, the memory device 24 could be configured to buffer input data for processing by the processor 22. Additionally or alternatively, the memory device 24 could be configured to store instructions for execution by the processor 22.

As noted above, the apparatus 20 may be embodied by a computing device 10 configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a head mounted display) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In one embodiment, the processor may also include user interface circuitry configured to control at least some functions of one or more elements of the user interface 28.

Meanwhile, the communication interface 26 may be any means such as a device or circuitry embodied in either hardware or a combination of hardware and software that is configured to receive and/or transmit data between the computing device 10 and a server 12. In this regard, the communication interface 26 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly, such as via Wi-Fi, Bluetooth or other wireless communications techniques. In some instances, the communication interface 26 may alternatively or also support wired communication. As such, for example, the communication interface 26 may include a communication modem and/or other hardware/software for supporting communication via cable, digital subscriber line (DSL), universal serial bus (USB) or other mechanisms. For example, the communication interface may be configured to communicate via wired communication with other components of the computing device.

The user interface 28 may be in communication with the processor 22, such as the user interface circuitry, to receive an indication of a user input and/or to provide an audible, visual, mechanical, or other output to a user. As such, the user interface may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. The user interface may also be in communication with the memory 24 and/or the communication interface 26, such as via a bus.

Overview

As described with reference to FIG. 1, service 12 may include one or more levels of load balancers or groups of load balancers and one or more servers or groups of servers. FIG. 3 shows a block diagram of an exemplary system that may be utilized to perform multi-level load balancing enabling the assignment of, for example, a DNS name to load balancers in a dynamically partitioned cluster environment. As shown, a first level of load balancers may comprise a first DNS first level load balancer 305, which may be embodied by a single load balancer or a group of load balancers. The first level of load balancers may also, in some embodiments, comprise any number of additional load balancers or groups of load balancers. For example, Nth DNS first level load balancer 310 is shown. Each first level load balancer (e.g., 305, 310) may be configured to communicate with each of one or more second level load balancers 315, 320, and 325. As should be readily understood, though three second level load balancers are shown, the present invention may be implemented with any number of second level load balancers.

Cluster configuration observer 350 and cluster configuration 355 may be included in service 12 or, in some embodiments, embodied by one or more computing devices (e.g., computer device 10 as shown in FIG. 1) configured to communicate directly with service 12 or via network 14. As shown cluster configuration observer 350 is configured to communicate with cluster configuration manager 355 and each of one or more second level load balancers 315-325. While the system of FIG. 3 depicts separate entities to illustrate the cluster configuration observer 350 and cluster configuration 355, in some embodiments, the cluster configuration observer 350 and cluster configuration 355 may be embodied by or functions of a same entity, such a sever and/or an application.

Each of the one or more second level load balancers 315-325 is configured to communicate with one or more servers/server groups 330-345. Again, though four servers/server groups are shown, the present invention may be implemented with any number of servers and/or server groups. Each server may be configured to host a particular instance of an application, the application may be called in response to a, for example, http request received by one of the first level load balancers, which in turn, may then pass that request to a second level load balancer, via for example a round robin assignment process, which is configured to determine whether any healthy instances of the application are running on any of the servers and if so, the host and port to which the application is bound. This process is described in more detail with reference to the data flow shown in FIG. 4 and the flowchart shown in FIGS. 5, 6, and 7.

While the system of FIG. 3 depicts two levels of load balancers, in some embodiments, one or more additional levels of load balancers may be utilized to perform the operations described herein. Moreover, while the system of FIG. 3 depicts the Cluster Configuration Observer 350 in communication with the second level load balancers, in some embodiments, the Cluster Configuration Observer 350 may communicate with and dynamically control both the first and second level load balancers, or in other embodiments, each of any number of load balancer levels.

In some embodiments, the cluster configuration observer 350 may be further configured to also manage the 1st level load balancers. That is, the cluster configuration observer 350 may be configured to manage the first level load balancers, or some portion thereof, and the second level load balancers, for example, at the same time. In an exemplary embodiment, the cluster configuration observer 350 may be configured to receive and/or utilize information indicative of (a) the service_port that an application is binding to in the second layer of load balancers, and/or (b) which load balancers in the first level of load balancers to assign to the application. In an instance in which information indicative of the service_port that an application is binding to in the second layer of load balancers is received/utilized, the cluster configuration managers can provide the service_port information, since it is possible to store additional metadata, such as description of the application, constraints when the application can be run, etc., about the applications. In an instance in which information indicative of which load balancers in the first level of load balancers to assign to the application is received and/or utilized, it depends what is the type of the load balancers—if it is a software based load balancer then the Cluster configuration observer 350 may be configured to request a creation of new pool of load balancers which will be bound to specific application, or if it is a hardware base load balancer then management of the pool (e.g., (re)assignment to application, scaling up or down for specific application, etc.) may be the responsibility of the cluster configuration observer 350.

Operation

In an example embodiment of the present invention, an apparatus or computer program product may be provided to implement or execute a method, process, or algorithm for providing multi-level load balancing enabling the assignment of a DNS name to load balancers in a dynamically partitioned cluster environment.

FIG. 4 shows an exemplary data flow, while FIGS. 5, 6, and 7 show flowcharts of the exemplary operations performed by a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 26 of an apparatus employing an embodiment of the present invention and executed by a processor 24 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIGS. 4, 5, 6, and 7 when executed, convert a computer or processing circuitry into a particular machine configured to perform an example embodiment of the present invention. Accordingly, the operations of FIGS. 4, 5, 6, and 7 define an algorithm for configuring a computer or processing to perform an example embodiment. In some cases, a general purpose computer may be provided with an instance of the processor which performs the algorithms of FIGS. 4, 5, 6, and 7 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included as shown by the blocks having a dashed outline in FIGS. 4, 5, 6, and 7. It should be appreciated that each of the modifications, optional additions or amplifications below may be included with the operations above either alone or in combination with any others among the features described herein.

Facilitating the Process

In some example embodiments, a method, apparatus and computer program product may be configured for providing a dynamically partitioned cluster environment and performing multi-level load balancing, thus enabling the assignment of a DNS name to load balancers. For example, some embodiments of the present invention may facilitate the assignment of a DNS name to load balancers in a dynamically partitioned cluster environment by, for example, utilizing multi-levels of load balancers. In some embodiments, a first level of load balancers may have access to metadata information where application instances are running and bound to specific service_port, so that application can be identifiable by the port to which it is bound. The second level of load balancers may be split into groups and each group may be configured to route traffic to specific service_port to the first layer of load balancers. As such, this solution comprises an additional layer of load balancers configured to monitor where applications are running and to which port there are bound, which is easy implementable in environments like Apache Mesos.

FIG. 4 shows a data flow diagram showing an exemplary process for facilitating the assignment of a DNS name to load balancers in a dynamically partitioned cluster environment. At operation 405, a cluster configuration observer request cluster configuration information. At operation 410, the cluster configuration manager may transmit or otherwise provide access to cluster configuration information. In some embodiments, the cluster configuration information may comprise routing information, the routing information comprising where application instances are running, and in some embodiments, specifically, a host IP address and port to which they are bounded. In some embodiments, an application instance may be bound to any random port.

A load balancer may be configured to receive and store routing information from, for example, the Cluster Configuration observer, and as shown at operation 415, may receive from or otherwise access the cluster configuration information from the cluster configuration observer. The information exchange may be periodic or real-time. In some embodiments, while the information exchange may be performed periodically, two extremes do exist. For example, in some embodiments, the load balancer may always request and/or initiate an information exchange or request from the cluster configuration observer. While such an embodiment may require additional computing resources, information will always be up-to-date. In other embodiments, the load balancer may always access cached information indicative of the routing rules and only periodically refresh the information, thus receiving the up-to-date routing rules from the cluster configuration observer. While this embodiment may require additional time when adding a server to the load balancing pool and/or require that the load balancer implement health check mechanism to prevent sending traffic to instances that are no longer in use, no unnecessary computing resources would be required.

In some embodiments, the cluster configuration observer may then periodically access the cluster configuration manager to identify updates to the cluster configuration information and, in some embodiments, receive one of either the updated portions of the cluster configuration information or the cluster configuration information as a whole. Accordingly, as shown in operation 420, the cluster configuration manager may notify the cluster configuration observer of a change in the cluster configuration information or that updated cluster configuration information is available. At operation 425, the cluster configuration observer may then request or in some embodiments execute a get command to access the updated cluster configuration information from the cluster configuration observer. The cluster configuration observer may then transmit the updated cluster configuration information to the cluster configuration observer, as shown in operation 430. At operation 435, the load balancer may then be provided with the updated cluster configuration information.

Subsequently, in the event of a, for example, HTTP request from a client device, as shown at operation 440, a first level load balancer assigned to a particular DNS name identified in the HTTP request may receive the HTTP request. At operation 445, the first level load balancer transmits the HTTP request to the second level load balancer. At operation 450, the second level load balancer determines the host and port identified by the HTTP request by consulting the cluster configuration information and, at operation 455, transmits the request to the determined host and port. At operation 460, the second level load balancer receives a response. At operation 465, the second level load balancer transmits the response to the first level load balancer. At operation 470, the first level load balancer returns the response to the client device. While FIG. 4 shows upon determination of the host and port and transmission of the request to the application, the response (e.g., a response signal) may additionally or alternatively, be transmitted to the client device (e.g., in addition to or instead of, transmission of the response signal to the second level load balancer which then transmits the response to a first level load balancer, which then transmits the response signal to the client device).

Operation of the Cluster Configuration Observer

In some example embodiments, a method, apparatus and computer program product may be configured for enabling the assignment of a DNS name to load balancers in a dynamically partitioned cluster environment by, for example, monitoring where applications are running and to which port there are bound. FIG. 5 is a flowchart showing an exemplary method of operating an example apparatus in accordance with an embodiment of the present invention.

As such, as shown in block 505 of FIG. 5, an apparatus, such as apparatus 20 embodied by the computing device 10 or cluster configuration observer, may be configured to receive information regarding host and port of each instance of at least a first application. The apparatus embodied by computing device 10 may therefore include means, such as the processor 22, the communication interface 26 or the like, for receiving information regarding host and port of each instance of at least a first application. For example, a particular instance of the first application may be running at Host A: Port B and as such, the cluster configuration observer may store a mapping of Application X: Instance Y to Host A: Port B, the host indicative of, for example, a particular server or group of servers running the application.

As such, as shown in block 510 of FIG. 5, an apparatus, such as apparatus 20 embodied by the computing device 10 or cluster configuration observer 350, may be configured to maintain routing rules. The apparatus embodied by computing device 10 may therefore include means, such as the processor 22, the communication interface 26 or the like, for maintaining the routing rules. For example, a number of instances of a plurality of applications may be running, each a particular host and port. The cluster configuration observer is provided with this information and maintains the cluster configuration information.

While maintaining the cluster configuration information, periodically the information is provided to or accessed by the second level load balancers. As such, as shown in block 515 of FIG. 5, an apparatus, such as apparatus 20 embodied by the computing device 10 or cluster configuration observer 350, may be configured to providing routing rules to second level load balancers. The apparatus embodied by computing device 10 may therefore include means, such as the processor 22, the communication interface 26 or the like, for providing routing rules to second level load balancers. For example, as is described in more detail with reference FIG. 6, the second level load balancers may be periodically provided with the cluster configuration information or updates thereto, or in some embodiments, may periodically access the information. In some embodiments, the second level load balancers may determine if any updates are available upon each request, or in other embodiments, may only update the information after a predetermined time period has elapsed.

Periodically or upon any update, the cluster configuration observer may determine if any updates are available. As such, as shown in block 520 of FIG. 5, an apparatus, such as apparatus 20 embodied by the computing device 10 or cluster configuration observer 350, may be configured to determine if a new host and/or new port is running an instance of any of the plurality of applications. The apparatus embodied by computing device 10 may therefore include means, such as the processor 22, the communication interface 26 or the like, for determining if a new host and/or new port is running an instance of any of the plurality of applications. For example, based on a request in which it is determined that no healthy instances of a particular application are running, a new instance of the application may be launched. The cluster configuration observer may be provided with or otherwise learn of the updated information.

In the event that updated cluster configuration information is available, the cluster configuration observer may be configured to update the cluster configuration information. As such, as shown in block 525 of FIG. 5, an apparatus, such as apparatus 20 embodied by the computing device 10 or cluster configuration observer 350, may be configured to update the cluster configuration information. The apparatus embodied by computing device 10 may therefore include means, such as the processor 22, the communication interface 26 or the like, for updating the cluster configuration information. For example, in some embodiments, additional routing may be added to identify the host and port of a new application instance.

As such, as shown in block 530 of FIG. 5, an apparatus, such as apparatus 20 embodied by the computing device 10 or cluster configuration observer 350, may be configured to provide updated cluster configuration information to second level load balancers. The apparatus embodied by computing device 10 may therefore include means, such as the processor 22, the communication interface 26 or the like, for providing updated cluster configuration information to second level load balancers.

Operation of a Second Level Load Balancer

In some example embodiments, a method, apparatus and computer program product may be configured for enabling the assignment of a DNS name to load balancers in a dynamically partitioned cluster environment by, for example, periodically receiving updated routing rule data and, upon receiving a particular DNS request, utilizing the updated routing rule data to determine where the particular DNS request should be routed. FIG. 6 is a flowchart showing an exemplary method of operating an example apparatus in accordance with an embodiment of the present invention. As discussed above, the assignment of a DNS name to load balancers in a dynamically partitioned cluster environment requires overcoming the problem that a single application is not always able to bind to the same port on every server due to the dynamic nature of the environment and thus a load balancer would not know where a particular application is running and to which port the application is bound. Accordingly, embodiments of the present invention may be configured to periodically receive updates on routing rules in order to be able to correctly identify whether and to where a particular DNS should be routed.

Accordingly, as shown in block 605 of FIG. 6, the apparatus 20 embodied by, for example, computing device 10 or one of load balancers 12A-12N or 315-325, may be configured to receive cluster configuration information from a cluster configuration observer, the cluster configuration information comprising information indicative of each of a plurality of instances of running application and one or more servers and associated ports to which at least one of the plurality of instances is bound. The apparatus 20 may therefore include means, such as the processor 22, the communication interface 26 or the like, for receiving cluster configuration information from a cluster configuration observer, the cluster configuration information comprising information indicative of each of a plurality of instances of running application and one or more servers and associated ports to which at least one of the plurality of instances is bound.

Subsequent to receiving and storing the cluster configuration information, the apparatus may be configured to receive requests. As shown in block 610 of FIG. 6, the apparatus 20 embodied by, for example, computing device 10 or one of load balancers 12A-12N or 315-325, may be configured to receive a request (e.g., an HTTP request received at a first level load balancer and redirected to the second level load balancer) for a first application. The apparatus 20 may therefore include means, such as the processor 22, the communication interface 26 or the like, for receiving the request for the first application. For example, the request may be from a first level load balancer, assigned a particular DNS name, the request being, for example, an HTTP request directed to the DNS name. The first level load balancer then passing or redirected the request to the second level load balancer. The HTTP request may require, in some embodiments, a call to a particular application. In some embodiments, a first level load balancer may transmit requests to any of the second level load balancers, for example, because every application may be bound to a specific service_port on every second level load balancer host. A request my comprise original content sent by the user and, in some embodiments, a load balancer may add additional metadata to indicate, for example, through which load balancer the request is from. In an exemplary embodiments, simple HTTP Servers that serves any http request may be utilized.

As such, as shown in block 615 of FIG. 6, the apparatus 20 embodied by, for example, computing device 10 or one of load balancers 12A-12N or 315-325, may be configured to determine if cluster configuration information is up-to-date. The apparatus 20 may therefore include means, such as the processor 22, the communication interface 26 or the like, for determining if the cluster configuration information is up-to-date. In some embodiments, the apparatus may be configured to determine whether the cluster configuration information is up-to date or in some embodiments, out-of-date (i.e. stale). For example, the cluster configuration information may be determined to be stale based on determining when the last time the information was updated and determining if a predetermined threshold of time has been met or exceeded since the update. That is, in an instance in which the cluster configuration information has not been updated in more than a particular time frame exceeding a predetermined threshold, the apparatus may be configured to update the information. In some embodiments, the cluster configuration information may be determined to be stale based on determining whether a previous call to a particular application (a same application or a different application) returned properly or returned an error, the error indicative of stale information.

In an instance in which a determination is made that the cluster configuration is not up-to-date, the apparatus may be configured to update the cluster configuration information. As such, as shown in block 620 of FIG. 6, the apparatus 20 embodied by, for example, computing device 10 or one of load balancers 12A-12N or 315-325, may be configured to request updated cluster configuration information. The apparatus 20 may therefore include means, such as the processor 22, the communication interface 26 or the like, for requesting updated cluster configuration information. In some embodiments, the apparatus may be configured to periodically receive, from the cluster configuration observer, updated cluster configuration information. Additionally or alternatively, the apparatus may be configured to periodically access the cluster configuration observer to update stored cluster configuration information. As described above, in some embodiments, the apparatus may be configured to request updated cluster configuration information upon reception of the request from the first level load balancer, for example, each time a request is received.

If the cluster configuration is determined to be up-to-date or upon the updating of the cluster configuration information, the apparatus may then determine whether an application is running. As shown in block 625 of FIG. 6, the apparatus 20 embodied by, for example, computing device 10 or one of load balancers 12A-12N or 315-325, may be configured to determine if there is a healthy instance of the first application. The apparatus 20 may therefore include means, such as the processor 22, the communication interface 26 or the like, for determining if there is a healthy instance of the first application.

In an instance in which the apparatus determines that there is no healthy instance of the first application or that the apparatus, based on the information available, does not possess information on a healthy instance of the first application, an error message may be returned. As such, as shown in block 630 of FIG. 6, the apparatus 20 embodied by, for example, computing device 10 or one of load balancers 12A-12N or 315-325, may be configured to return an error message. The apparatus 20 may therefore include means, such as the processor 22, the communication interface 26 or the like, for returning an error message. For example, in an instance in which there is no healthy instance, the apparatus may be configured to report an error back. In some embodiments, for example in an instance in which a healthy instance is determined, the apparatus may be provided with, for example, hosts:ports information by Cluster Configuration Observer. In some embodiments, in an instance in which no healthy instance is available, the apparatus may be configured to request execution and be provided with, for example, hosts:ports information by Cluster Configuration Observer.

As shown in block 635 of FIG. 6, the apparatus 20 embodied by, for example, computing device 10 or one of load balancers 12A-12N or 315-325, may be configured to consult routing rules and determine a host and a port of an instance of the application. The apparatus 20 may therefore include means, such as the processor 22, the communication interface 26 or the like, for consulting routing rules and determining the host and port at which an instance of the application is bound. For example, in some embodiments, the apparatus may be configured to access a routing table, the routing table configured to store the information indicative of the one or more servers and the associated ports to which the at least one of the plurality of instances of the first application is bound.

Upon determination of the host and port, the request may be transmitted to the identified location. As such, as shown in block 640 of FIG. 6, the apparatus 20 embodied by, for example, computing device 10 or one of load balancers 12A-12N or 315-325, may be configured to transmit the request to the host and port to which the instance of the first application is bound. The apparatus 20 may therefore include means, such as the processor 22, the communication interface 26 or the like, for transmitting the request to the host and port to which the instance of the first application is bound.

Subsequent to transmitting the request, the apparatus may be configured to await a response and after a period of time, receive a response. That is, as shown in block 645 of FIG. 6, the apparatus 20 embodied by, for example, computing device 10 or one of load balancers 12A-12N or 315-325, may be configured to receive a response to the transmitted request. The apparatus 20 may therefore include means, such as the processor 22, the communication interface 26 or the like, for receiving a response to the transmitted request. For example, upon determination that an instance of the first application is running at Host A: Port X, the request is transmitted and the response is subsequently received. In an exemplary embodiments, for example, where a mobile device requests retrieval of a history of sensor measurements through HTTP protocol, the response may include list of such measurements.

As shown in block 650 of FIG. 6, the apparatus 20 embodied by, for example, computing device 10 or one of load balancers 12A-12N or 315-325, may be configured to transmit the response to the first level load balancer. The apparatus 20 may therefore include means, such as the processor 22, the communication interface 26 or the like, for transmitting the response to the first level load balancer.

Operation of a First Level Load Balancer

In some example embodiments, a method, apparatus and computer program product may be configured for enabling the assignment of a DNS name to load balancers in a dynamically partitioned cluster environment and specifically for assigning the DNS name to the first level load balancers. As described above, first level load balancers may be assigned a DNS name and upon receiving a request requiring an application call, transmit the request to the second level load balancers, which have periodically received updated routing rule data and are therefore able to determine where the particular DNS request should be routed. FIG. 7 is a flowchart showing an exemplary method of operating an example apparatus in accordance with an embodiment of the present invention.

As shown in block 705 of FIG. 7, the apparatus 20 embodied by, for example, computing device 10 or one of load balancers 12A-12N or 305-310, may be configured to receive assignment of a DNS name. The apparatus 20 may therefore include means, such as the processor 22, the communication interface 26 or the like, for receiving assignment of a DNS name. For example, the first level load balancer may be assigned exemplarydomainname.com such that http requests to exemplarydomainname.com are routed to the IP address of the first level load balancer. Subsequently, as shown in block 710 of FIG. 7, the apparatus 20 embodied by, for example, computing device 10 or one of load balancers 12A-12N or 305-310, may be configured to receive a request (e.g., an HTTP request) from a client device. The apparatus 20 may therefore include means, such as the processor 22, the communication interface 26 or the like, for receiving a request from a client device. For example, the request may be an http request directed to the DNS name. As such, as shown in block 715 of FIG. 7, the apparatus 20 embodied by, for example, computing device 10 or one of load balancers 12A-12N or 305-310, may be configured to provide request to a second level load balancer. The apparatus 20 may therefore include means, such as the processor 22, the communication interface 26 or the like, for providing request to a second level load balancer.

As shown in block 720 of FIG. 7, the apparatus 20 embodied by, for example, computing device 10 or one of load balancers 12A-12N or 305-310, may be configured to receive a response from the second level load balancer, the second level load balancer, as described above having identified a host and port of an instance of the application, redirected the request to the identified host and port and received a response. The apparatus 20 may therefore include means, such as the processor 22, the communication interface 26 or the like, for receiving response to the second level load balancer. As such, as shown in block 725 of FIG. 7, the apparatus 20 embodied by, for example, computing device 10 or one of load balancers 12A-12N or 305-310, may be configured to provide the response to the client device. The apparatus 20 may therefore include means, such as the processor 22, the communication interface 26 or the like, for providing the response to the client device.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system enabling the assignment of a DNS name to load balancers in a dynamically partitioned cluster environment, the system comprising:
a first level load balancer;
a second level load balancer;
a cluster configuration observer; and
a plurality of servers, each configured to run one or more instances of applications, an instance of a first application being bound to a first port,
the cluster configuration observer configured to:
receive cluster configuration information, the cluster configuration information comprising information indicative of one or more instances of a plurality of running applications, including an instance of a first application and associated ports to which the one or more of instances is bound including a specific port to which the instance of the first application is bound; and
provide the cluster configuration information to a second level load balancer;
the second level load balancer configured to:
receive configuration information of the second level load balancer that comprises the cluster configuration information;
receive a request from the first level load balancer requiring a call to the first application, wherein the request is an HTTP request received at a first level load balancer and configured to be redirected to one or more of a plurality of second level load balancers;
determine, based on the cluster configuration information, to which port on the one or more of the plurality of the second level load balancers, the instance of the first application is bound, wherein the instance of the first application is bound to a same, specific port on the one or more of the plurality of second level load balancers;
transmit the request to the port to which the instance of the first application is bound at the second level load balancers; and
receive a response from the instance of the first application;
the first level load balancer configured to:
receive the request from a client device;
transmit, to the second level load balancer, the request; and
receive the response from the second level load balancer; and
transmit the response to the client device.

2. An apparatus comprising at least one processor and at least one memory including computer program code, the at least one memory and the computer program code configured to, with the processor, cause the apparatus to:
receive cluster configuration information from a cluster configuration observer, the cluster configuration information comprising information indicative of a plurality of instances of a plurality of running applications, including an instance of a first application and one or more servers and associated ports to which at least one of the plurality of instances is bound including a specific port to which the instance of the first application is bound;
receive a request from a first level load balancer requiring a call to the first application, wherein the request is an HTTP request received at a first level load balancer and configured to be redirected to one or more of a plurality of second level load balancers;
determine, based on the cluster configuration information, to which port, on one or more of the plurality of the second level load balancers, the instance of the first application is bound, wherein the instance of the first application is bound to a same, specific port on the one or more of the plurality of second level load balancers;
transmit the request to the port to which the instance of the first application is bound at the second level load balancers; and
receive a response from the instance of the first application.

3. The apparatus according to claim 2, wherein the apparatus further comprises computer program code configured to, with the processor, cause the apparatus to:
determine, based on the cluster configuration information, whether a healthy instance of the first application is running.

4. The apparatus according to claim 2, wherein the apparatus further comprises computer program code configured to, with the processor, cause the apparatus to:
determine whether the cluster configuration information is stale, and in an instance in which a determination is made that the cluster configuration is stale, updating the cluster configuration information.

5. The apparatus according to claim 2, wherein the apparatus further comprises computer program code configured to, with the processor, cause the apparatus to:
maintain storage of the cluster configuration information; and
periodically access the cluster configuration observer to update stored cluster configuration information.

6. The apparatus according to claim 2, wherein the apparatus further comprises computer program code configured to, with the processor, cause the apparatus to:
periodically receive, from the cluster configuration observer, updated cluster configuration information.

7. The apparatus according to claim 2, wherein the computer program code configured to, with the processor, cause the apparatus to determine, based on the cluster configuration information, to which port the instance of the first application is bound, further comprises computer program code configured to, with the processor, cause the apparatus to:
access a routing table, the routing table configured to store the information indicative of the one or more servers and the associated port to which the instance of the first application is bound.

8. The apparatus according to claim 2, wherein the apparatus further comprises computer program code configured to, with the processor, cause the apparatus to:
request updated cluster configuration information upon reception of the request from the first level load balancer.

9. A computer program product comprising at least one non-transitory computer-readable storage medium having computer-executable program code instructions stored therein, the computer-executable program code instructions comprising program code instructions for:

receiving cluster configuration information from a cluster configuration observer, the cluster configuration information comprising information indicative of a plurality of instances of a plurality of running applications, including an instance of a first application and one or more servers and associated ports to which at least one of the plurality of instances is bound including a specific port to which the instance of the first application is bound;

receiving a request from a first level load balancer requiring a call to the first application, wherein the request is an HTTP request received at a first level load balancer and configured to be redirected to one or more of a plurality of second level load balancers;

determining, based on the cluster configuration information, to which port, on the one or more of the plurality of the second level load balancers, the instance of the first application is bound, wherein the instance of the first application is bound to a same, specific port on the one or more of the plurality of second level load balancers;

transmitting the request to the port to which the instance of the first application is bound at the second level load balancers; and receiving a response from the instance of the first application.

10. The computer program product according to claim 9, wherein the computer-executable program code instructions further comprise program code instructions for:
determining, based on the cluster configuration information, whether a healthy instance of the first application is running.

11. The computer program product according to claim 9, wherein the computer-executable program code instructions further comprise program code instructions for:
determining whether the cluster configuration information is stale, and in an instance in which a determination is made that the cluster configuration is stale, updating the cluster configuration information.

12. The computer program product according to claim 9, wherein the computer-executable program code instructions further comprise program code instructions for:
maintaining storage of the cluster configuration information; and
periodically accessing the cluster configuration observer to update stored cluster configuration information.

13. The computer program product according to claim 9, wherein the computer-executable program code instructions further comprise program code instructions for:
periodically receiving, from the cluster configuration observer, updated cluster configuration information.

14. The computer program product according to claim 9, wherein the computer-executable program code instructions comprising program code instructions for causing the apparatus to determine, based on the cluster configuration information, to which port the instance of the first application is bound, further comprise program code instructions for:
accessing a routing table, the routing table configured to store the information indicative of the one or more servers and the associated port to which the instance of the first application is bound.

15. The computer program product according to claim 9, wherein the computer-executable program code instructions further comprise program code instructions for:
requesting updated cluster configuration information upon reception of the request from the first level load balancer.

16. A method comprising:
receiving cluster configuration information from a cluster configuration observer, the cluster configuration information comprising information indicative of a plurality of instances of a plurality of running applications, including an instance of a first application and one or more servers and associated ports to which at least one of the plurality of instances is bound including a specific port to which the instance of the first application is bound;

receiving a request from a first level load balancer requiring a call to the first application, wherein the request is an HTTP request received at a first level load balancer and configured to be redirected to one or more of a plurality of second level load balancers;

determining, based on the cluster configuration information, to which port, on the one or more of the plurality of the second level load balancers, the instance of the first application is bound, wherein the instance of the first application is bound to a same, specific port on the one or more of the plurality of second level load balancers;

transmitting the request to the port to which the instance of the first application is bound at the second level load balancers; and receiving a response from the instance of the first application.

17. The method according to claim 16, further comprising:
determining, based on the cluster configuration information, whether a healthy instance of the first application is running.

18. The method according to claim 16, further comprising:
determining whether the cluster configuration information is stale, and in an instance in which a determination is made that the cluster configuration is stale, updating the cluster configuration information.

19. The method according to claim 16, further comprising:
maintaining storage of the cluster configuration information; and
periodically accessing the cluster configuration observer to update stored cluster configuration information.

20. The method according to claim 16, further comprising:
periodically receiving, from the cluster configuration observer, updated cluster configuration information.

21. The method according to claim 16, wherein step of causing the apparatus to determine, based on the cluster configuration information, to which port the instance of the first application is bound, further comprises:
accessing a routing table, the routing table configured to store the information indicative of the one or more servers and the associated port to which the instance of the first application is bound.

22. The method according to claim 16, further comprising:
requesting updated cluster configuration information upon reception of the request from the first level load balancer.

* * * * *